(12) United States Patent
Mielenz

(10) Patent No.: US 9,715,634 B2
(45) Date of Patent: Jul. 25, 2017

(54) METHOD AND DEVICE FOR DETERMINING A DISTANCE OF A VEHICLE FROM A TRAFFIC-REGULATING OBJECT

(71) Applicant: Robert Bosch GmbH, Stuttgart (DE)

(72) Inventor: Holger Mielenz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/620,325

(22) Filed: Feb. 12, 2015

(65) Prior Publication Data

US 2015/0227801 A1 Aug. 13, 2015

(30) Foreign Application Priority Data

Feb. 12, 2014 (DE) .................. 10 2014 202 503

(51) Int. Cl.
*G06K 9/00* (2006.01)
*G01C 3/08* (2006.01)
*G06T 7/73* (2017.01)
*G06K 9/32* (2006.01)

(52) U.S. Cl.
CPC .......... *G06K 9/00825* (2013.01); *G01C 3/08* (2013.01); *G06T 7/74* (2017.01); *G06K 9/00818* (2013.01); *G06K 9/32* (2013.01); *G06T 2207/10004* (2013.01); *G06T 2207/20021* (2013.01); *G06T 2207/30252* (2013.01); *G06T 2207/30261* (2013.01)

(58) Field of Classification Search
None
See application file for complete search history.

(56) References Cited

U.S. PATENT DOCUMENTS

| 9,164,511 B1* | 10/2015 | Ferguson | G05D 1/0231 |
| 2011/0182475 A1* | 7/2011 | Fairfield | G06K 9/00825 382/104 |
| 2013/0253754 A1* | 9/2013 | Ferguson | G05D 1/0231 701/28 |
| 2015/0003670 A1* | 1/2015 | Kuehnle | G06K 9/00805 382/103 |

FOREIGN PATENT DOCUMENTS

| DE | 10 2011 105 520 | 12/2011 |
| DE | 102010063006 | 6/2012 |
| DE | 10 2011 081 609 | 2/2013 |

\* cited by examiner

*Primary Examiner* — Oneal R Mistry
(74) *Attorney, Agent, or Firm* — Norton Rose Fulbright US LLP; Gerard Messina

(57) ABSTRACT

A method is provided for determining a distance of a vehicle from a traffic-regulating object, including the following steps:
  taking an image of the vehicle surroundings,
  in case of the presence of a traffic-regulating object in the image taken, determining an image size of the object in the image taken,
  providing an object size of the object in the vehicle surroundings,
  determining the distance of the vehicle from the object based on the image size and on the object size.
A corresponding device, a corresponding driver assistance system, as well as a corresponding computer program are also provided.

1 Claim, 2 Drawing Sheets

METHOD AND DEVICE FOR DETERMINING A DISTANCE OF A VEHICLE FROM A TRAFFIC-REGULATING OBJECT

FIELD OF THE INVENTION

The present invention relates to a method and a device for determining a distance of a vehicle from a traffic-regulating object. In addition, the present invention relates to a driver assistance system.

BACKGROUND INFORMATION

A method in a driver assistance system having a front camera in a vehicle is known from German Published Patent Application No. 10 2010 063 006. The method includes the following steps: Taking an image of a region situated in front of the vehicle using the camera, evaluating the image taken for the presence of a stop line, and selective triggering, based on the evaluation, of an automatic reaction of the driver assistance system for the accurately aimed stopping at the stop line.

SUMMARY

An object on which the present invention is based may therefore be seen in providing a method for determining a distance of a vehicle from a traffic-regulating object.

The object on which the present invention is based may also be seen as indicating a device for determining a distance of a vehicle from a traffic-regulating object.

The object on which the present invention is based may also be seen as indicating driver assistance system for a vehicle.

Furthermore, the object on which the present invention is based may be seen as providing a computer program.

According to one aspect, a method is provided for determining a distance of a vehicle from a traffic-regulating object, including the following steps:
  taking an image of the vehicle surroundings,
  in case of the presence of a traffic-regulating object in the image taken, determining an image size of the object in the image taken,
  providing an object size of the object in the vehicle surroundings,
  determining the distance of the vehicle from the object based on the image size and on the object size.

According to one further aspect, a device is provided for determining a distance of a vehicle from a traffic-regulating object, including:
  an image-taking device for taking an image of a vehicle surroundings,
  an evaluation device for evaluating the image for the presence of a traffic-regulating object in the image.
  the evaluation device being developed, in the case of the presence of a traffic-regulating object in the image, to determine an image size of the object in the image and, based on an object size of the object made available of the vehicle surroundings and on the image size, to determine the distance of the vehicle from the object.

According to one still further aspect, a driver assistance system is provided for a vehicle, the driver assistance system including the device for determining the distance of a vehicle from a traffic-regulating object, the driver assistance system being designed to guide the vehicle based on the determined distance of the vehicle from the object. That is, the vehicle is guided using the driver assistance system. And this takes place based on the determined distance of the vehicle from the object. Thus, the guiding takes place based on the determined distance of the vehicle from the object.

According to another aspect, a computer program is provided, which includes program code to carry out the method for determining a distance of a vehicle from a traffic-regulating object when the computer program is run on a computer.

The present invention thus includes, in particular, the idea of determining a distance of a vehicle from a traffic-regulating object in the vehicle surroundings, based on the real object size and on the image size of the object in a taken image. This determining is carried out particularly based on the intercept method, which is known as such to one skilled in the art. Thus it enables a simple, robust and reliable possibility of determining the distance. Knowing the distance between the vehicle and the traffic-regulating object is particularly important for an automated guidance of the vehicle without the intervention of the driver. This therefore means, in particular, that using the present invention it is effected in an advantageous manner that an automated guidance of the vehicle is enabled without an intervention by the driver. Consequently, this means in particular that, based on the determined distance, the vehicle is guided, or is able to be guided in automated fashion. This takes place using the driver assistance system.

Such a distance determination is also especially possible if no position determination based on GPS signals is possible. Consequently, independence from a GPS system is effected. In case a GPS system for position determination is nevertheless available, a position equalization may be carried out in particular, based on the determined distance and the position determined using the GPS system, which is able to increase the accuracy of the position determination.

A traffic-regulating object, within the meaning of the present invention, particularly designates an object which regulates traffic and/or specifies a driving direction. So this means, for example, that the object makes a specification to which the vehicles in the traffic have to adhere, as a rule. The object may specify a driving direction, for example, which the vehicles have to follow to travel to a certain destination, for example.

According to one specific embodiment, a plurality of traffic-regulating objects may be provided, in which, in particular, one respective distance is able to be determined according to the present invention between the vehicle and the plurality of traffic-regulating objects. The plurality of objects may, in particular, be formed to be equal or preferably different.

A size, that is, an object size and/or an image size, within the meaning of the present invention, may be a length, a width or an height, for example. In particular, a plurality of sizes of the object determined respectively may be provided. The size may particularly refer to an area or a partial element of the object. It may refer, for instance, only to a traffic sign without the associated mast, or, in a light signal system, to the light signal system head, that is, to the part which outputs the light signals.

According to another specific embodiment, it may be provided that the object be classified into one of several object classes, in each case a standard size being associated with the object classes, so that the standard size of the object class into which the object was classified is provided as the object size of the object.

For this reason, no longer does one have to store its own size for each object, but only for the object class. This advantageously saves memory space.

According to a further specific embodiment, it may be provided that in the image taken, a search region be defined based on positions of the objects to be searched for relative to a current travel lane of the vehicle, traffic-regulating objects being searched for in the search region.

Thereby, a reliable and more robust detection of a traffic-regulating object may advantageously be effected in the image taken. Such a search region may also be designated as a "region of interest" (ROI). In particular, such a search region may be determined based on an instantaneous vehicle position, which may be determined using a GPS sensor, for example.

In one further specific embodiment, it may be provided that the object be an element selected from the following group of objects: a light signal system, traffic signs, variable message signs, direction signs or variable direction signs.

In a further specific embodiment, it may be provided that the traffic-regulating object is a light signal system and that a distance between a stop line assigned to the light signal system and the light signal system be provided, based on the distance between the stop line and the light signal system and the determined distance of the vehicle from the light signal system, a distance of the vehicle from the stop line being determined, a light signal emitted using the light signal system being recorded, the vehicle being guided, based on the distance of the vehicle from the stop line, in such a way that it stops at the stop line if the recorded light signal is a stop signal.

Thereby, the stop line may be advantageously determined as a stopping place or stopping position that is to be driven towards or aimed at. That is, in an advantageous manner, the automated stopping at a light signal system, which is emitting a stop signal, is thus made possible. Since the distance from the stop line is known, the guidance of the vehicle may be adapted correspondingly. For instance, in case of a lower distance from the stop line, one has to decelerate more strongly than in case of a greater distance of the vehicle from the stop line.

According to one further specific embodiment, it may be provided that the object size be provided using a digital map.

Such a digital map may particularly include the object size and/or respective distances of traffic-regulating objects from a stop line of a light signal system and/or a distance of a light signal system from a stop line of the light signal system. Such data are particularly provided using digital map data of the digital map.

According to one specific embodiment, a navigation system may be provided. This includes especially a GPS sensor for determining an instantaneous vehicle position. The navigation system preferably includes the digital map.

According to another specific embodiment, it may be provided that the image-taking device include an image sensor and/or a video sensor. Such sensors may be included in a camera, for instance, a monocamera or a stereocamera or a camera of a monovideo or a stereovideo system, for example. Consequently, the image-taking device may include one or more of such cameras, for example. Using a camera, a signal may advantageously be recorded which is emitted by the light signal system. Thereby, because of an appropriate evaluation of the image taken, using the evaluation device, it may be ascertained what type of signal is involved, such as a stop signal.

The statements made in connection with the method apply analogously to the device, and vice versa. This then means in particular that the device features come about analogously to the method features and vice versa. This means in particular that the device is especially developed to carry out the method.

According to a further aspect, a vehicle is provided that includes the device or the driver assistance system.

DETAILED DESCRIPTION

Figure 1:
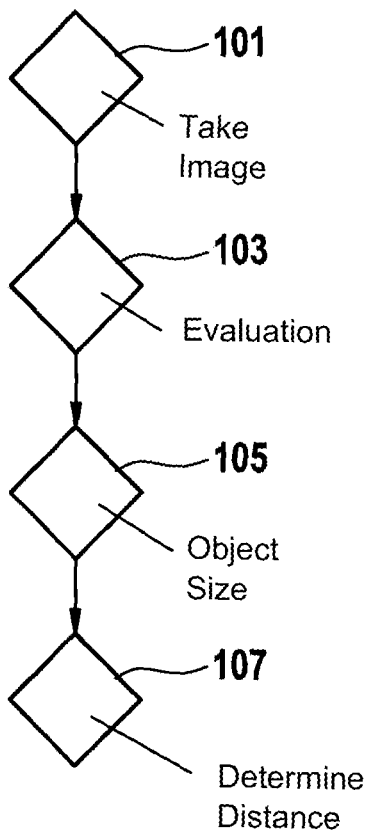
FIG. 1 a flow chart of a method for determining a distance of a vehicle from a traffic-regulating object.

FIG. 1 shows a flow chart of a method for determining a distance of a vehicle from a traffic-regulating object. The object may be a light signal system, for instance.

According to a step 101, an image is taken of a vehicle surroundings. This image is evaluated to see whether a traffic-regulating object is present in the image taken. This evaluation is carried out in a step 103, whereby in case of the presence of a traffic-regulating object in the image taken, an image size of the object in the image taken is determined. It is then provided that, in a step 105, an object size of the object in the vehicle surroundings be provided. This means, in particular, that the real object size of the object in the real world is provided. In particular, the object size may be taken or queried from a navigation system including a digital map having digital map data.

In a step 107, the distance is then determined of the vehicle from the object, based on the image size and on the object size. This is carried out particularly based on the intercept method. The intercept method is known as such, to one skilled in the art, from geometry. The intercept method is also particularly designated as intercept theorem.

Figure 2:
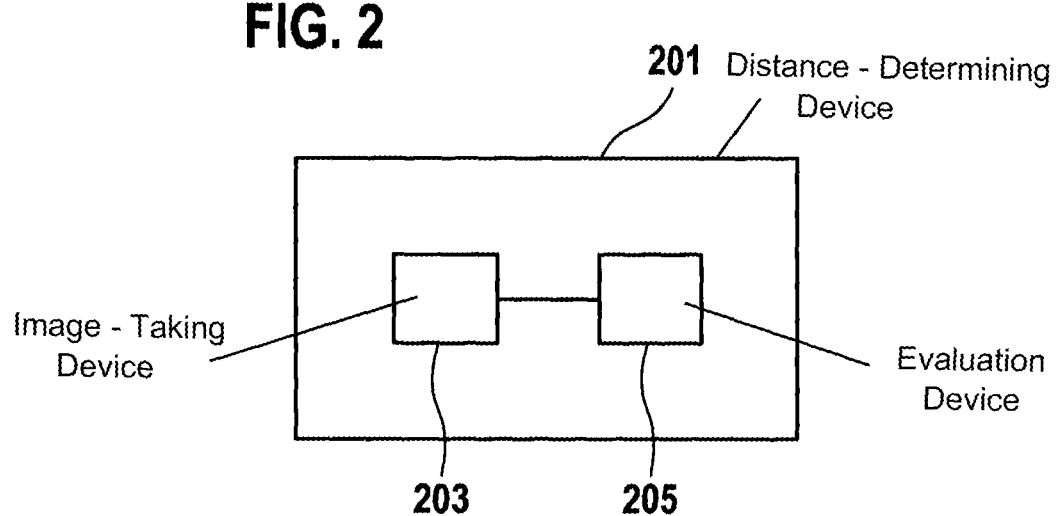
FIG. 2 a device for determining a distance of a vehicle from a traffic-regulating object.

FIG. 2 shows a device 201 for determining the distance of a vehicle (not shown) from a traffic-regulating object.

Device 201 includes an image-taking device 203 for taking an image of the vehicle surroundings. Image-taking device 203 especially includes a camera having an image sensor and/or a video sensor. In particular, the camera may be a monocamera or a stereocamera. In particular, a plurality of cameras may be provided, which are preferably developed differently or particularly developed to be equal. According to the present invention, a search is made, in each taken image of the camera, for traffic-regulating objects, and if one is present, a distance of the vehicle from the object is determined.

Furthermore, device 201 includes an evaluation device 205 for evaluating the image taken for the presence of a traffic-regulating object in the image. This, then, means in particular that image-taking device 203 makes the image taken available to evaluation device 205 for evaluation.

Evaluation device 205 is further developed, in the case of the presence of a traffic-regulating object in the image, to determine an image size of the object in the image and, based on an object size of the object made available in the vehicle surroundings and on the image size, to determine the distance of the vehicle from the object. This is carried out particularly based on the intercept method.

Figure 3:
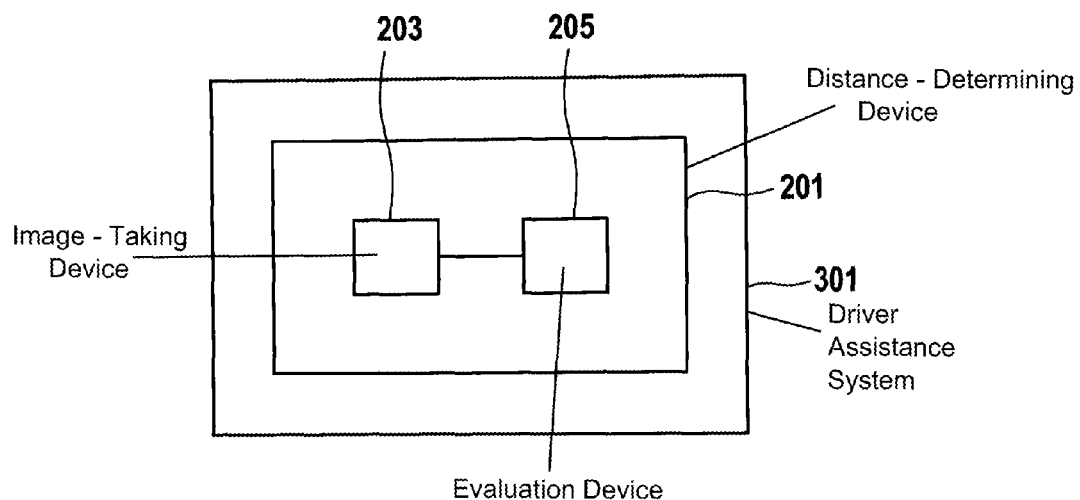
FIG. 3 a driver assistance system for a vehicle.

FIG. 3 shows a driver assistance system 301 for a vehicle (not shown).

Driver assistance system 301 includes a device 201 as in FIG. 2. Driver assistance system 301 is designed to guide the vehicle based on the determined distance. In particular, driver assistance system 301 is designed to guide the vehicle based on a determined distance of the vehicle from a stop line of a light signal system, in order to bring it to a halt at the stop line.

In one specific embodiment that is not shown, it may be provided that the evaluation device is equipped to recognize which light signal the light signal system is emitting. Consequently, the evaluation device is advantageously able to recognize whether the light signal system is emitting a stop signal, for example.

Figure 4:
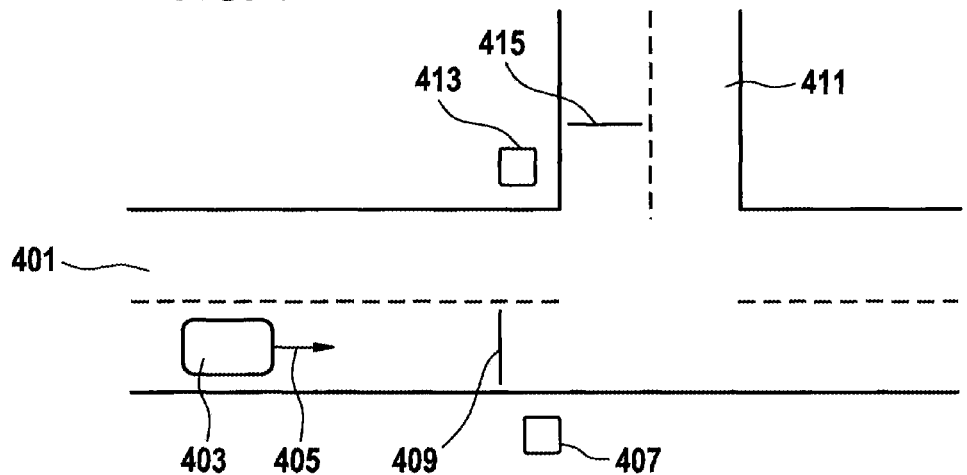
FIG. 4 a vehicle traveling in the direction of a light signal system.

FIG. 4 shows a road 401 on which a vehicle 403 is traveling. A driving direction of vehicle 403 is denoted by an arrow bearing reference numeral 405. Vehicle 403 includes device 201 according to FIG. 2 or driver assistance system 301 according to FIG. 3, for reasons of clarity, device 201 or driver assistance system 301 not being shown explicitly in FIG. 4.

Vehicle 403 is traveling towards a light signal system 407 having an associated stop line 409. According to the present invention, it is provided that, using the device, or more precisely using the driver assistance system, a determination be carried out of the distance of vehicle 403 from light signal system 407 and/or from stop line 409. This is to take place particularly corresponding to the above statements. Based on the determined distance or rather, the determined distances, the driver assistance system may, for instance, guide vehicle 403 in such a way that it comes to a halt at stop line 409 when light signal system 407 emits a stop signal.

For explanation, but not for restriction, a road 411 coming from the left-hand side is drawn in, which, at the intersection or in the crossing area between further road 411 and road 401, has an additional light signal system 413 having a further associated stop line 415. This being the case, FIG. 4 is showing a T crossing.

Thus, the present invention particularly includes the idea of ascertaining or determining a distance of a vehicle from a light signal system and/or from a stop line relevant to this, that is, an associated stop line. For this purpose, particularly image data, for instance, of a monovideo system are evaluated and correspondingly an image size of the light signal system in the image data is determined. A digital map is particularly used which includes data on a real object size of the light signal system and associated distance data of the light signal system from the stop line. The distance determination is then particularly carried out based on the intercept method of geometry.

What is claimed is:

1. A method for determining a distance of a vehicle from a traffic-regulating object, comprising:
   taking an image of vehicle surroundings;
   in case of the presence of a traffic-regulating object in the image, determining an image size of the object in the image;
   providing an object size of the object in the vehicle surroundings; and
   determining the distance of the vehicle from the object based on the image size and on the object size wherein:
   the traffic-regulating object is a light signal system,
   a distance between a stop line associated with the light signal system and the light signal system is provided,
   based on the distance between the stop line and the light signal system and the determined distance of the vehicle from the light signal system, a distance of the vehicle from the stop line is determined,
   a light signal using the light signal system is emitted,
   the emitted light signal is recorded,
   the vehicle is guided based on the distance of the vehicle from the stop line in such a way that the vehicle stops at the stop line if the recorded light signal is a stop signal.

* * * * *